US012711713B2

(12) United States Patent

Wilkes

(10) Patent No.: US 12,711,713 B2

(45) Date of Patent: *Aug. 18, 2026

(54) REACTIVE AUGMENTED REALITY

(71) Applicant: Stephen Wilkes, Westport, CT (US)

(72) Inventor: Stephen Wilkes, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,924

(22) Filed: Dec. 5, 2023

(65) Prior Publication Data

US 2024/0104868 A1 Mar. 28, 2024

Related U.S. Application Data

(63) Continuation of application No. 17/385,545, filed on Jul. 26, 2021, now Pat. No. 11,861,798.

(60) Provisional application No. 63/056,340, filed on Jul. 24, 2020.

(51) Int. Cl.

*G06T 19/00* (2011.01)
*G06T 15/20* (2011.01)
*G06T 15/50* (2011.01)
*G06T 17/05* (2011.01)

(52) U.S. Cl.

CPC .......... *G06T 19/006* (2013.01); *G06T 15/205* (2013.01); *G06T 15/50* (2013.01); *G06T 17/05* (2013.01); *G06T 2215/12* (2013.01); *G06T 2215/16* (2013.01)

(58) Field of Classification Search

None

See application file for complete search history.

(56) References Cited

U.S. PATENT DOCUMENTS

| | | | |
|---|---|---|---|
| 9,122,707 B2 | 9/2015 | Wither et al. | |
| 10,768,776 B1 | 9/2020 | Roche et al. | |
| 11,861,798 B2 * | 1/2024 | Wilkes | G06T 19/006 |
| 2008/0094417 A1 | 4/2008 | Cohen | |
| 2010/0161295 A1 | 6/2010 | Heil et al. | |
| 2013/0044128 A1 | 2/2013 | Liu et al. | |

(Continued)

OTHER PUBLICATIONS

Alessandro Fiore, Luca Mainetti, Luigi Manco, Palmalisa Marra, “Augmented Reality for Allowing Time Navigation in Cultural Tourism Experiences: A Case Study”, 2014, Augmented and Virtual Reality, ARV 2014, Lecture Notes in Computer Science, vol. 8853pp. 296-301 (Year: 2014).*

(Continued)

*Primary Examiner* — Michael J Cobb

(74) *Attorney, Agent, or Firm* — Fish & Richardson P.C.

(57) ABSTRACT

Methods, systems, and apparatus, including computer programs encoded on computer storage media, for generating composite images. One of the methods includes maintaining first data associating each location within an environment with a particular time; obtaining an image depicting the environment from a point of view of a display device; obtaining second data characterizing one or more virtual objects; and processing the obtained image and the second data to generate a composite image depicting the one or more virtual objects at respective locations in the environment from the point of view of the display device, wherein the composite image depicts each virtual object according to the particular time that the first data associates with the location of the virtual object in the environment.

20 Claims, 4 Drawing Sheets

(56) References Cited

U.S. PATENT DOCUMENTS

| | | | | |
|---|---|---|---|---|
| 2013/0328927 | A1* | 12/2013 | Mount | G06T 19/20 345/633 |
| 2018/0122142 | A1* | 5/2018 | Egeler | G06T 17/00 |
| 2018/0143756 | A1 | 5/2018 | Mildrew | |
| 2018/0275410 | A1* | 9/2018 | Yeoh | G02B 27/0172 |
| 2019/0065027 | A1 | 2/2019 | Hauenstein et al. | |
| 2019/0094981 | A1* | 3/2019 | Bradski | G06V 40/168 |
| 2019/0102946 | A1 | 4/2019 | Spivack et al. | |
| 2019/0172262 | A1* | 6/2019 | McHugh | G06F 3/011 |
| 2019/0378369 | A1 | 12/2019 | Washington et al. | |
| 2020/0035024 | A1 | 1/2020 | Price et al. | |
| 2020/0192553 | A1* | 6/2020 | Van De Sluis | G06F 3/04842 |
| 2020/0302681 | A1 | 9/2020 | Totty et al. | |
| 2021/0074074 | A1 | 3/2021 | Goodrich et al. | |
| 2021/0090333 | A1* | 3/2021 | Ravasz | G02B 27/01 |
| 2022/0101613 | A1 | 3/2022 | Rockel | |
| 2022/0189122 | A1 | 6/2022 | Li et al. | |
| 2023/0139337 | A1 | 5/2023 | Noam et al. | |
| 2023/0350539 | A1* | 11/2023 | Owen | G06F 3/017 |

OTHER PUBLICATIONS

Razvan Gabriel Boboc, Mihai Duguleana, Gheorghe-Daniel Voinea, Cristian-Cezar Postelnicu, Dorin-Mircea Popovici, Marcello Carrozzino, “Mobile Augmented Reality for Cultural Heritage: Following the Footsteps of Ovid among Different Locations in Europe” , 2019, Sustainability 2019, 1167, pp. 1-20 (Year: 2019).*

[No Author Listed] [online], “Augmented Reality, Advertising, Billboard,” Apr. 23, 2021, retrieved Jul. 14, 2022, <https://www.youtube.com/watch?v=gm8Zq8zh2wY>, 1 page [Video Submission].

Alldieck et al., “Video based reconstruction of 3D people models,” submitted on Apr. 16, 2018, arXiv:1803.04758v3 [cs.CV], 11 pages.

Boboc et al., “Mobile Augmented Reality for Cultural Heritage: Following the Footsteps of Ovid among Different Locations in Europe,” Sustainability, 2019, 1167:1-20.

Fiore et al., “Augmented Reality for Allowing Time Navigation in Cultural Tourism Experiences: A Case Study”, Augmented and Virtual Reality, ARV 2014, Lecture Notes in Computer Science, 2014, 8853:296-301.

Kanazawa et al., “Learning category-specific mesh reconstruction from image collections,” submitted on Jul. 30, 2018, arXiv:1803.07549v2 [cs.CV], 21 pages.

Steinicke et al., “Gradual Transitions and their Effects on Presence and Distance Estimation,” 2009, Computers & Graphics, 34(2010):26-33.

Zuffi et al., “Lions and tigers and bears: capturing non-rigid, 3D, articulated shape from image,” in proceedings of the IEEE conference on computer vision and pattern recognition, Jun. 2018, 9 pages.

* cited by examiner

300

REACTIVE AUGMENTED REALITY

CROSS-REFERENCE TO RELATED APPLICATIONS

This application is a continuation and claims priority to pending U.S. patent application Ser. No. 17/385,545, filed Jul. 26, 2021, which claims priority to U.S. Provisional Patent Application No. 63/056,340, filed on Jul. 24, 2020. The entire content of these applications are incorporated herein by reference.

BACKGROUND

This specification related to augmented reality, where a system is configured to generate composite images of a real-world environment that include depictions of one or more virtual objects inserted into the real-world environment.

SUMMARY

This specification describes an augmented reality system that generates composite images depicting an environment with one or more virtual objects inserted into the environment, where the depiction of the one or more virtual objects is dependent upon the location of the virtual object within the environment. That is, the system renders each of the virtual objects according to the location of the virtual object in a common coordinate system of the environment. For example, a virtual object can be depicted at different times of day according to the location of the virtual object within the common coordinate system of the environment. As another example, a virtual object can be depicted at different times of year according to the location of the virtual object within the common coordinate system of the environment. As another example, a virtual object can be depicted as if the virtual object where in different time points, e.g., at different years in history, according to the location of the virtual object within the common coordinate system of the environment.

This specification also describes an augmented reality system that generates composite images of an environment for display on a display device according to the location of the display device in the environment. That is, the depiction of the environment in the composite image is dependent on the determined location of the display device within the environment. For example, the composite image can characterize the environment at different times of day according to the location of the display device. As another example, the composite image can characterize the environment at different times of the year, e.g., at different seasons, according to the location of the display device. As another example, the composite image can characterize the environment at different time points in history, e.g., at different years in history, according to the location of the display device.

This specification also describes an augmented reality system that generates composite images for display on a display device, where depictions of virtual objects in the composite images are reactive to a distance between a user of the display device and the virtual objects. For example, if the distance between the user and a virtual object satisfies (e.g., is above or is below) a predetermined threshold, the system can trigger an animation of the virtual object to be rendered on the display device. As a particular example, the virtual object can be an animal, and the composite images can depict the animal reacting to the approach of the user, e.g., by depicting the animal looking up. As another example, if the distance between the user and a virtual object satisfies a predetermined threshold, the augmented reality system can trigger the virtual object to emit a sound. That is, the augmented reality system can generate a composite directional sound that includes a sound seemingly emitted by the virtual object. In this specification, a sound is "directional" if the sound is configured to be perceived by a user as originating from a particular location. That is, a directional sound is a sound that is perceived to be coming from an object at a particular location in the environment, and can be influenced by the user's position relative to the object, the user's distance to object, etc. As a particular example, the virtual object can be an animal, and the animal can be depicted as reacting to the approach of the user by sniffing, barking, roaring, etc.

The subject matter described in this specification can be implemented in particular embodiments so as to realize one or more of the following advantages. Using techniques described in this specification, a system can generate composite images that seamlessly merge virtual objects based on different times of day, times of the year, and time periods in history. For example, the system can show a user, in a single monoscopic or stereoscopic image, how an environment looks across an entire day, year, century, or millennium. Using techniques described in this specification, a system can further immerse the user by allowing one or more virtual objects to react to the approach of the user, giving the impression to the user that the virtual objects are truly in the environment and interacting with the user. The system can thus recreate the emotional and physical experiences that the user experiences in the natural world.

In some implementations described in this specification, a system can generate composite images more efficiently than some existing systems, e.g., using fewer computational resources and/or less time. For example, as described in this specification, a system can generate composite images on mobile devices that have limited computational resources. Furthermore, in some implementations described in this specification, the system can generate composite images in real-time and display the images to a user as if the user were viewing a real-world environment. In particular, using some techniques described in this specification, a system can generate composite images that include millions, tens of millions, hundreds of millions, or billions of pixels in real time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
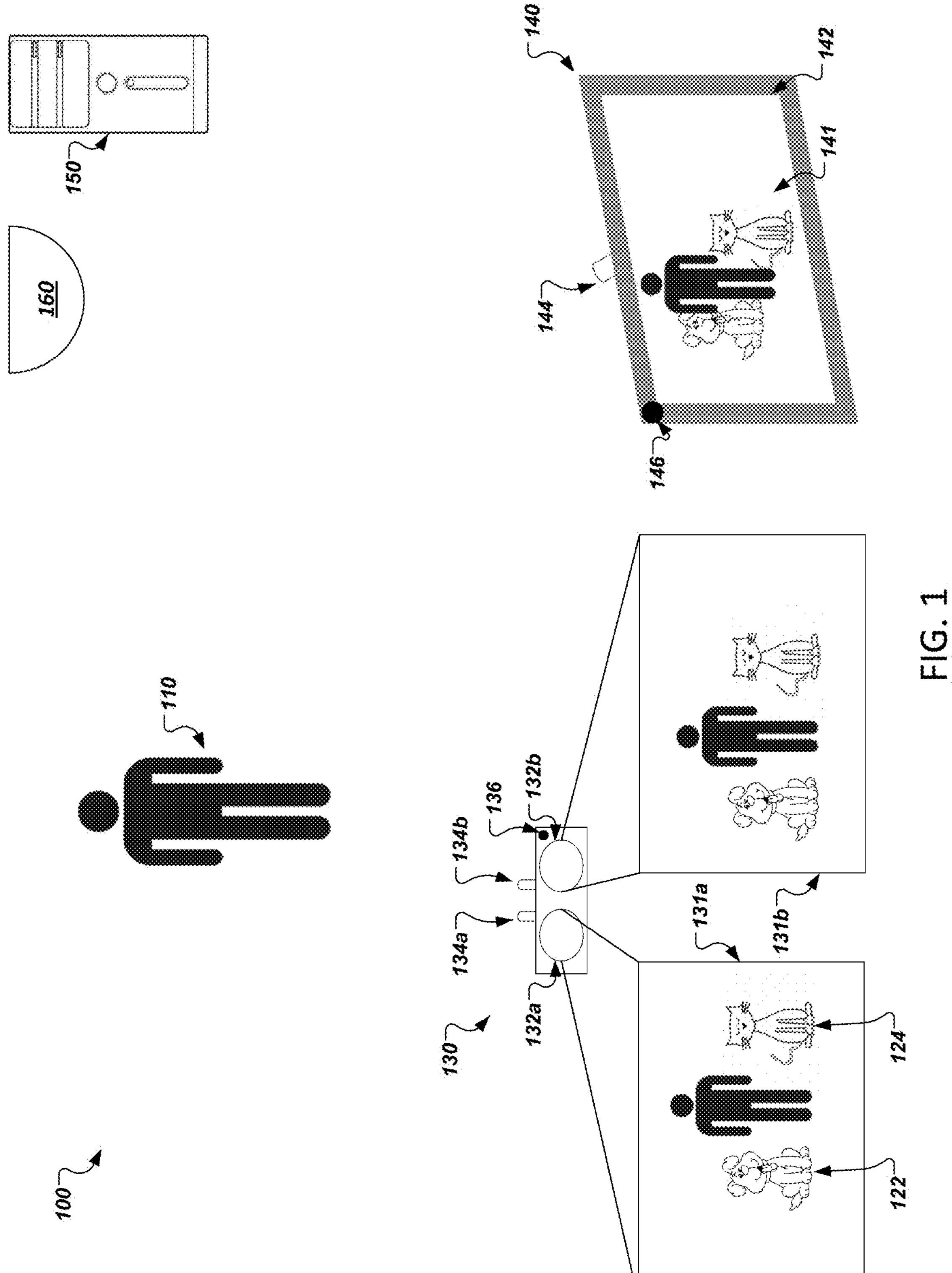
FIG. 1 is a diagram of an example system.

Mobile devices have realized a revolution in imagery and motion picture entertainment. Mobile devices may feature sophisticated image capture, positional and orientation systems, and high quality displays. Together, these devices can be used to support emerging applications, often labelled augmented reality, that render virtual objects on a display in the real-world physical environment of the user operating an augmented reality system (e.g., a wireless phone or head-mounted display). These augmented reality applications may be configured to achieve varying degrees of reality, as if the virtual objects were actually present in the physical environment of the user. Alternatively, the virtual objects may be modified to reflect certain aspects of the local environment while also including some distinguishing aspects that support safety and other objectives.

An educational environment may be supported through various applications that present a user experience from other remote locations. For example, a classroom of school children may use augmented reality technologies in order to bring animals from a safari experience (e.g., the great migration) into a classroom. Alternatively or in addition, portions of a classroom can be brought into portions of Tanzanian landscape replete with animals.

In this example, the virtual animals brought into this location may be generated off of a detailed and sophisticated model previously developed by a photographer in the field. This model may include rich imagery that is assembled to develop a three dimensional structure for each creature (object). The object may have texture and color developed from the underlying imagery and video footage. The model also may capture and model behavior from creatures (objects) in the field environment. However, underlying capture may not account for lighting conditions (e.g., location, time of day, and atmospheric settings) that reflect similar lighting useful for rendering realistic images in a recreation. The model of a creature (object) may be specified to reflect the ambient lighting as captured (e.g., location, time of day, and atmospheric settings)). Alternatively or in addition, the captured imagery may be transformed into a normative model. This normative model may genericize the underlying object to a neutral rendering. The neutral rendering then may be further modified so that later a relatively simple transformation may be performed relative to the neutral rendering in order to achieve location-specific rendering. This may be used to reduce the computational complexity of transforming an object in a first environment to accurately reflect the conditions of the second environment. Such a transformation may reduce the number of operations that are later performed. In some configurations, the transformation to a genericized model may reduce the likelihood of inaccuracies or discrepancies tied to circumstances of the initial capture.

This specification describes a system that generates composite images depicting one or more virtual objects in an environment.

FIG. 1 is a diagram of an example system 100. The system 100 is an example of a system implemented as computer programs on one or more computers in one or more locations, in which the systems, components, and techniques described below can be implemented.

The system 100 includes a physical object 110 (in this example, a human). Images of a scene that includes the physical object 110 can be captured by a first device 130 and/or a second device 140. That is, the "scene" referenced in the below descriptions is a scene of the physical object 110 from the perspective of the first device 130 or the second device 140.

The first device 130 and/or the second device 140 can capture a still image of the scene or a video of the scene composed of multiple frames. The first device 130 and the second device 140 can then send the captured images to an image processing system 150 to generate composite images. That is, the image processing system 150 is configured to generate composite images 131*a* and 131*b* for display on the first device 130 and a composite image 141 for display on the second device 140.

In some implementations, one device can capture images of the scene, and a different device can display the images. That is, the first device 130 and/or the second device 140 can each be composed of two different devices, one of which captures images and the other of which displays images.

The first device 130 is a stereoscopic device. That is, the first device 130 captures images of the scene and displays the captured images (or composite images generated from the captured images) in stereo. In other words, the first device 130 captures images from two different perspectives that both correspond to a respective eye of the user. The first device 130 includes a first display 132*a* and a second display 132*b*, and a first camera 134*a* and a second camera 134*b*. In some implementations, the first device 130 can have more than two cameras. The first camera 134*a* and the second camera 134*b* are separated by a distance on the first device 130 so that the two cameras can capture the scene in stereo, correlating to the two distinct perspectives of the eyes of the user. The first composite image 131*a* depicts the scene from the perspective of the first camera 134*a*, and the second composite image 131*b* depicts the scene from the perspective of the second camera 134*b*.

The second device 140 is a monoscopic device. That is, the second device 140 captures images of the scene and displays the captured images (or composite images generated from the captured images) monoscopically. The first device includes a display 142 and a camera 144 that perform similar functions to the displays and cameras of the first device 130. The third image 141 depicts the scene from the perspective of the camera 144.

The first device 130 can include a tracker component 136 and the second device 140 can include a tracker component 146. Each tracker component can be used to track the location and orientation of the corresponding device in a common coordinate system of the system 100. For example, the tracker components can use a global positioning system (GPS) or a cellular network to determine the location and/or orientation of the corresponding device. As another example, the tracking components 136 and 146 can interact with a tracking base station 160 to determine the location and orientation of the devices continuously in real-time. The tracking base station 160, optionally included in the system 100, is a master tracking device that allows the location of every object in the system 100 that has a tracker component to have its position and/or orientation determined. In some implementations, the tracking base station 160 determines the location of each object; in some other implementations, each object determines its own location using the tracker base station 460.

The first device 130 and the second device 140 can send the respective captured images of the scene to the image processing system 150. In some implementations, the image processing system 150 is on-site, e.g., in the same building or in the same room as the devices 130 and 140. In some other implementations, the image processing system 150 is off-site, e.g., on the cloud. In some other implementations, the image processing system 150 is a component of the first device 130 and/or the second device 140. In other words, each of the devices can include a respective version of the image processing system 150, so that the initial images of the scene can be processed on-device.

The image processing system 150 can insert a first virtual object 122 (in this example, a dog) and a second virtual object 124 (in this example, a cat) into the images captured by the first device 130 and the second device 140. In particular, the image processing system 150 can maintain data characterizing the location and orientation of the virtual objects 122 and 124 within the common coordinate system of the system 100. The image processing system 150 can then process the respective captured images to insert depictions of the virtual objects 122 and 124 into the positions in the captured images corresponding to the locations of the virtual objects 122 and 124 within the common coordinate system of the system 100.

In some implementations, the depictions of the virtual objects 122 and 124 in the composite images 131*a-b* and 141 can depend on the respective locations of the virtual objects within the common coordinate system of the system 100. This process is described in more detail below with reference to FIG. 2A and FIG. 2B.

In some implementations, the depictions of the virtual objects 122 and 124 in the composite images 131*a-b* and 141 can depend on the respective locations of the devices 130 and 140. This process is described in more detail below with reference to FIG. 2A and FIG. 2B.

In some implementations, the image processing system 150 can further process the composite images 131*a-b* and 141 to change the depiction of the entire scene according to the respective locations of the devices 130 and 140 and/or according to the common coordinate system of the system 100. This process is described in more detail below with reference to FIG. 2A and FIG. 2B.

In some implementations, the image processing system 150 can determine that a distance between one of the devices 130 or 140 and one of the virtual objects 122 or 124 satisfies a threshold distance, and trigger the virtual object 122 or 124 to execute an animation in the corresponding composite image. This process is discussed in more detail below with reference to FIG. 2A and FIG. 2B.

The image processing system 150 can provide the composite images 131*a-b* and 141 to the devices 130 and 140, respectively, for display to users of the devices 130 and 140.

The image processing system 150 can perform this process repeatedly in order to generate a sequence of composite images. For example, the image processing system 150 can perform this process repeatedly in order to generate a video sequence of composite images in real-time or in pseudo-real-time, i.e., so that the video sequence of composite images is perceived by the users of the devices 130 and 140 as being real-time. In particular, if a user moves the first device 130 or the second device 140, the image processing system 150 can continuously generate images that depict the scene from the updated different locations and orientations within the common coordinate system of the system 100.

Figure 2A:
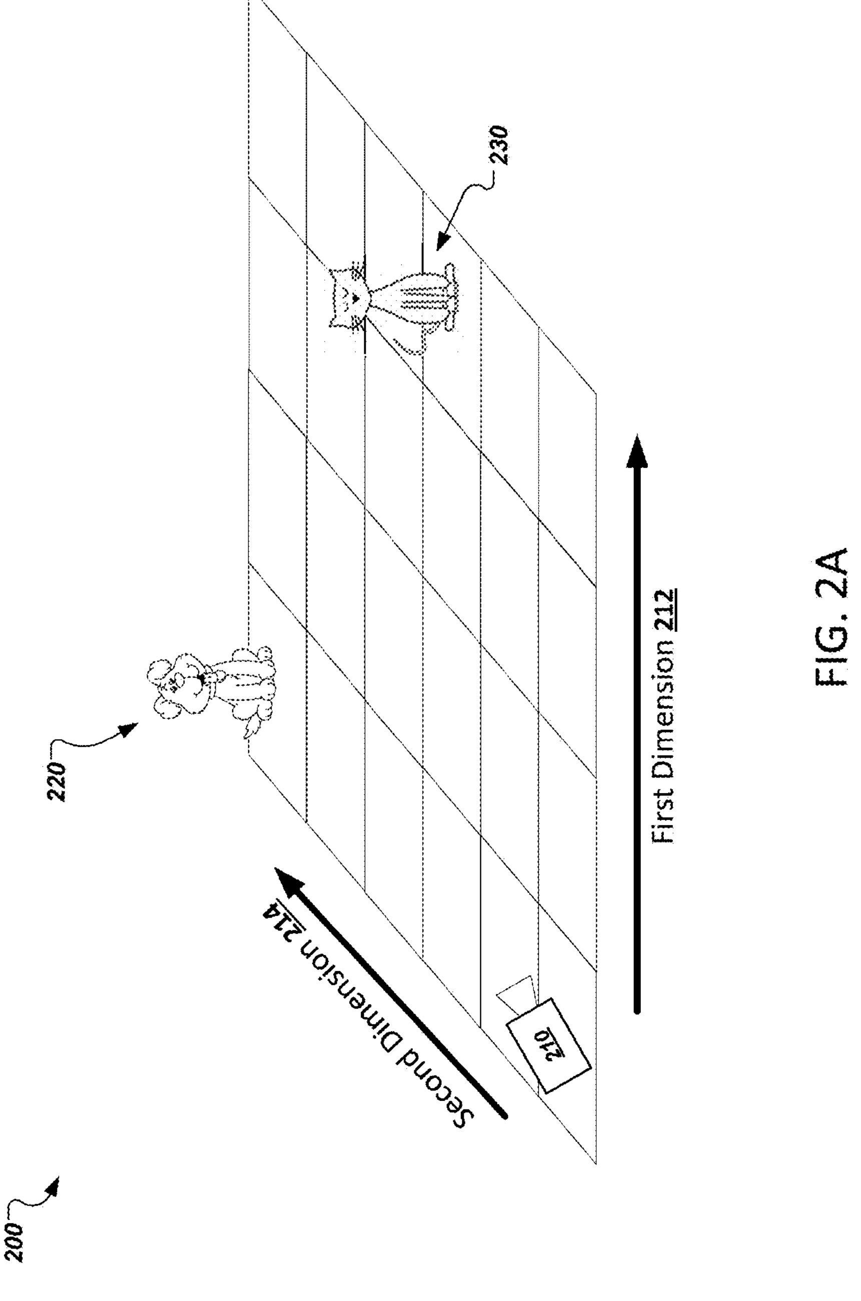
FIG. 2A and FIG. 2B are diagrams of example environments.
Figure 2B:
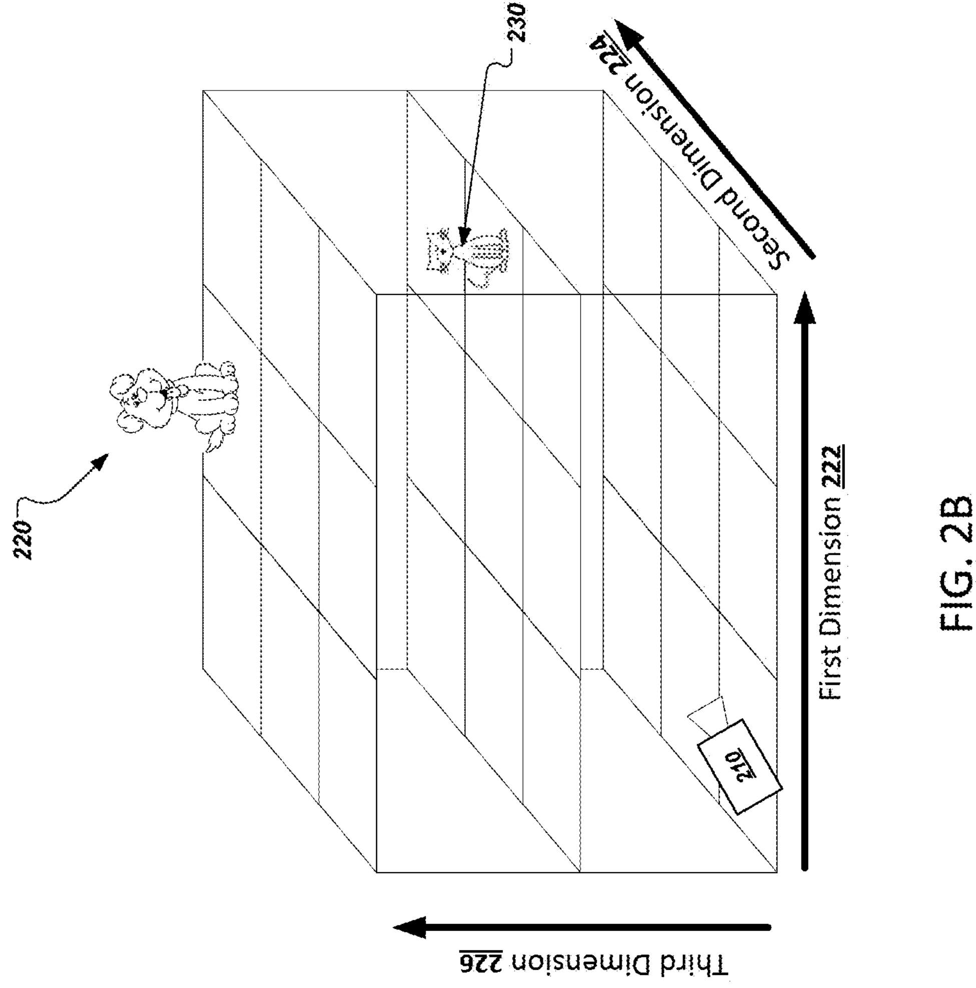

FIGS. 2A and 2B are diagrams of example environments 200 and 250, respectively. In FIG. 2A, the environment 200 is defined by a common coordinate system having two dimensions 212 and 214. In FIG. 2B, the environment 250 is defined by a common coordinate system having three dimensions 222, 224, and 226.

Referring to FIG. 2A, the environment 200 includes a device 210, a first virtual object 220, and a second virtual object 230. The device 210 is configured to capture images of the environment 200 and send the captured images to an image processing system, e.g., the image processing system 150 depicted in FIG. 1, for processing to generate composite images that include the virtual objects 220 and 230.

The image processing system can generate different composite images according to the respective locations, within the two-dimensional common coordinate system of the environment 200, of (i) the device 210, (ii) the virtual objects 220 and 230, or (iii) both.

As a first example, the depictions of the virtual objects 220 and 230 in the composite images can depend on the respective locations of the virtual objects within the two-dimensional common coordinate system of the environment 200. For example, the depiction of the virtual objects 220 and 230 can depend on the position of the virtual objects along the first dimension 212 and/or the second dimension 214 of the environment 200.

In some implementations, the respective depictions of the virtual objects 220 and 230 depend only on a single dimension. For example, as the virtual object 220 moves along the first dimension 212, the depiction of the virtual object 220 can change (e.g., the virtual object 220 can be depicted at a different time of day), but as the virtual object 220 moves along the second dimension 214, the depiction of the virtual object can remain constant. The dimension along which the depictions of the virtual objects 220 and 230 change can be selected to be any appropriate dimension of the environment 200. For example, given a coordinate system of the environment 200 defined by the first dimension 212 and the second dimension 214, a third dimension can be defined on which the depictions of the virtual objects 220 and 230 depend, e.g., a third dimension that is diagonal with respect to the first dimension 212 and the second dimension 214 (i.e., is a weighted mean between the first dimension 212 and the second dimension 214). As a particular example, the dimension can be defined with reference to a light source in the environment 200, e.g., by defining the dimension to be the same direction as the light source. This process is described below with reference to FIG. 3.

In some other implementations, the respective depictions of the virtual objects 220 and 230 depend on both dimensions 212 and 214. For example, as the virtual object 220 moves along the first dimension 212, the depiction of the virtual object can change (e.g., the virtual object 220 can be depicted at a different time of day), and as the virtual object 220 moves along the second dimension 214, the depiction of the virtual object 220 can change in a different way than the first dimension 212 (e.g., the virtual object 220 can be depicted at a different time of year).

In some implementations, the image processing system maintains multiple different model of the virtual objects 220 or 230, e.g., by storing the multiple different models in a data store of the image processing system. Then, when generating a depiction of a virtual object 220 or 230 according to the location of the virtual object 220 or 230 within the environment 200, the image processing system can obtain the model of the virtual object 220 or 230 that corresponding to the location of the virtual object within the environment 200. In some other implementations, the image processing system maintains a single respective model of the virtual objects 220 or 230. Then, when generating a depiction of a virtual object 220 or 230 according to the location of the virtual object 220 or 230 within the environment 200, the image processing system can obtain the single model of the virtual object 220 or 230 and process the single model to update the depiction of the virtual object according to the location of the virtual object within the environment 200.

In some implementations, the respective models representing the virtual objects 220 and/or 230 can be generated using sensor data characterizing a real-world object corresponding to the virtual object. For example, a model generation system can be configured generating the models of the virtual object 220 using sensor data characterizing a real-world dog, e.g., using one or more of: one or more videos of a real-world dog, one or more sets of LIDAR data of a real-world data, one or more audio recordings of a real-world dog, and so on. As a particular example, the model generation system can be configured to receive image data (e.g., RGB images or LIDAR images) depicting the dog from multiple different angles, and to process the image data to generate a model of the virtual object 220. The sensor data can further characterize the dog performing one or more different actions, e.g., walking towards the sensor, walking away from the sensor, and so on. The model generation system can use the sensor data to generate animations for the model of the virtual object 220.

In some such implementations, the respective models representing the virtual objects 220 and/or 230 can be generated according to one or more stereoscopic videos of the corresponding real-world object, where each stereoscopic video includes a sequence of stereoscopic frames that each depict the real-world object from multiple slightly different points of view, as described above with reference to FIG. 1.

In one example, the environment 200 can include a ruin of an ancient building, and the depiction of each of multiple components of the ancient building in the composite image can depend on the location of the component in the environment 200. As a particular example, each component of the ancient building can be depicted as the component would have looked in a time period corresponding to the location of the component, so that the user can view, in a single composite image, both how the building used to look and how the ruin currently looks.

In a second example, the respective depictions of the virtual objects 220 and 230 in the composite images can depend on the location of the device 210 in the common coordinate system of the environment 200. For example, the respective depictions of the virtual objects 220 and 230 can depend on the position of the device 210 along the (i) first dimension 212 of the environment 200, (ii) the second dimension 214 of the environment 200, or (iii) both.

In some implementations, the respective depictions of the virtual objects 220 and 230 depend only on the position of the device 210 along a single dimension. For example, as the device 210 moves along the first dimension 212, the depiction of the virtual object 220 can change (e.g., such that the virtual object 220 is depicted at a different time of day), but as the device 210 moves along the second dimension 214, the depiction of the virtual object 220 can remain constant.

For example, as a user walks into the Roman Colosseum using an augmented reality display configured as described above, the display can gradually augment the imagery so that the user is transformed to perceive the early days of the venue during the Roman Empire. The imagery can be augmented using location-based triggers so that the transition becomes more immersive as the user progresses further into the venue. For example, a first model showing the construction of the Colosseum can be displayed to the user during the first 10 meters. As the user progresses another 10 meters, a completed venue can be rendered. When the user reaches a viewing platform more than 20 meters into the venue, one of the historic gladiator fights or naval battles can be rendered.

The model and systems can be configured to support one or more safety protocols. For example, animated action can be stopped (or limited) until the user's velocity stops or is reduced below a predetermined threshold. These safety features also can reduce the intensity or brightness of the display as the user walks along a safety rail or other users. When the system conveys safety and position information allowing a computational determination that the user is safe or unlikely to collide with other objects, the intensity can be increased. Similarly, the user model can render animated action when the system determines that there is less than a threshold likelihood of collision (or that the user is in a "safe" location).

As another example, the system can maintain data characterizing one or more locations within the environment 200 as "dangerous" locations, i.e., locations which the user is disallowed or discouraged from going. For example, the set of dangerous locations can include a ledge off of which the user might fall or a boundary of the environment 200 that the user is not permitted to pass. The system can then present one or more alerts to the user when the user approaches a dangerous location to inform the user of the danger.

As a particular example, the system can display a first alert on the screen of an augmented reality display device, e.g., the display device 130 or 140 depicted in FIG. 1, when the distance between the user and the dangerous location passes below a first threshold (e.g., the system can display a pop-up alert on the display device). That is, the system can continuously obtain the current location of the user in the environment 200, and compare the current location of the user against the predetermined dangerous location within the environment. Instead of or in addition to displaying a visual alert, the system can emit an audible alert, e.g., a warning beep, when the user passes below the first threshold distance.

The system can then display a second alert to the user when the distance between the user and the dangerous location passes below a second threshold that is lower than the first threshold. The second alert can be more attention-grabbing (e.g., a larger visual alert or a louder audible alert) than the first alert, in order to inform the user that the user is even closer to the dangerous location than before. The system can display any number of alerts corresponding to different thresholds. A final alert (corresponding to the lowest threshold) can be to disable the augmented reality system altogether so that the user can view the environment without any additional virtual objects or animations, thus allowing the user to have a more complete view of the true environment and, in particular, the dangerous location.

The augmented reality display can include navigational assistance to illustrate the triggering point or direction for the next display. An arrow or spatial boundary can be used to identify where the user can perceive or trigger the next depiction. A label on the arrow (or spatial boundary) can be used to illustrate which experience will be triggered.

An immersive audio experience can accompany one or more of the models of the virtual objects in the environment. For example, the construction of the Colosseum can be associated with audio simulating construction of the venue. Similarly, the roar of a full crowd can be rendered when the user enters a simulated gladiator fight.

In some other implementations, the respective depictions of the virtual objects 220 and 230 depend on the respective positions of the device 210 along both dimensions 212 and 214. For example, as the device 210 moves along the first dimension 212, the depiction of the virtual object 220 can change (e.g., the virtual object 220 can be depicted at a different time of day), and as the device 210 moves along the second dimension 214, the depiction of the virtual object 220 can change in a different way than the first dimension 212 (e.g., the virtual object 220 can be depicted at a different time of year).

As a particular example, the environment 200 can include a ruin of an ancient building, and the depiction of the building can change according to the location of the device 210 within the environment 200, so that the user can move through the environment 200 and witness the change of the building through history, as described above.

As another particular example, the image processing system can generate a composite image that depicts the environment 200 in different weather according to the location in the environment 200. For example, locations along the first dimension 212 of the common coordinate system can be depicted as having different temperatures, and locations along the second dimension 214 of the common coordinate system can be depicted as having different magnitudes of precipitation. As a particular example, the object 220 can be depicted as relatively cold and subject to a relatively large amount of precipitation, while the object 230 can be depicted as relatively hot and subject to a relatively small amount of precipitation.

In a third example, the image processing system can process the composite images to change the depiction of the entire environment 200 according to the location of the device 210. For example, in addition to changing the depiction of the virtual objects to reflect a different time of day according to the location of the device 210, the image processing system can process the entire composite image so that the entire environment 200 appears as it would during the time of day corresponding to the location of the device 210.

In a fourth example, the image processing system can process the composite images to change the depiction of the entire environment 200 according to the common coordinate system of the environment 200. For example, in addition to changing the depiction of the virtual objects to reflect a different time of day according to the respective location of the virtual objects within the environment 200, the image processing system can process the entire composite image so that each component of the environment 200 appears as it would during the time of day corresponding to the location of the component in the environment 200. An example composite image generated in this way is described below with reference to FIG. 3.

In a fifth example, the image processing system can determine that a distance between the device 210 and one of the virtual objects 220 or 230 satisfies a predetermined threshold (e.g., is above or below the predetermined threshold), and trigger the virtual object 220 or 230 to execute an animation in the composite image. For example, as the device 210 approaches the virtual object 220 (in this example, a dog), the dog might look up at the user of the device 210 and wag its tail. That is, if the device 210 is outside of the threshold distance to the virtual object 220, the image processing system generates a composite image without such an animation; when the device 210 comes within the threshold distance, the image processing system generates a composite image with the animation. As another example, the image process system can generate a composite sound that includes a dog's bark when the device 210 moves outside of the threshold distance of the virtual object 220.

In some implementations, the environment 200 is a virtual environment; that is, composite images of the environment 200 that include the objects 220 and 230 can be generated by a virtual reality system.

In some other implementations, the environment 200 is a real environment; that is, composite images of the environment 200 that include the objects 220 and 230 can be generated by an augmented reality system. In some such implementations, the augmented reality system can determine the two-dimensional common coordinate system according to the environment 200, e.g., according to the dimensions of the environment 200 or according to one or more obstructions within the environment 200. That is, the two-dimensional common coordinate system can be adaptable based on limitations of the environment 200. For example, the common coordinate system can be adaptable based on a size of available space in the environment 200. In some implementations, the augmented reality system can determine the common coordinate system by processing sensor data characterizing the environment 200 (e.g., one or more RGB images or LIDAR images of the environment 200) using a machine learning model that is configured to process images of environments and to generate model outputs characterizing an optimal configuration of a common coordinate system.

Referring to FIG. 2B, the image processing system can generate different composite images according to the respective locations of the device 210 and the virtual objects 220 and 230 within a three-dimensional common coordinate system of the environment 250. As described above with reference to the environment 200 of FIG. 2A, the environment 250 can be either a virtual environment or a real-world physical environment.

In a first example, the depictions of the virtual objects 220 and 230 in the composite images can depend on the respective locations of the virtual objects within the three-dimensional common coordinate system of the environment 250. For example, the depictions of the virtual objects 220 and 230 can depend on the position of the virtual objects along one or more of: a first dimension 222, a second dimension 224, or a third dimension 226 of the environment 250.

For example, the depictions of the virtual objects 220 and 230 can depend on a single dimension of the environment 250, e.g., a fourth dimension that is defined with respect to the first dimension 222, the second dimension 224, and the third dimension 226, as described above. As a particular example, the fourth dimension can be skew relative to the three dimensions 222, 224, and 226, e.g., diagonal relative to the three dimensions 222, 224, and 226.

As another example, as the virtual object 220 moves along the first dimension 222, the depiction of the virtual object can change (e.g., the virtual object 220 can be depicted at a different time of day); as the virtual object moves along the second dimension 224, the depiction of the virtual object can change in a different way than the first dimension 222 (e.g., the virtual object 220 can be depicted at a different time of year); and as the virtual object moves along the third dimension 226, the depiction of the virtual object can change in a different way than the first dimension 222 and second dimension 224 (e.g., the virtual object 220 can be depicted in a different year or century).

As another example, the depictions of the virtual objects 220 and 230 can depend on four different dimensions: the three dimensions 222, 224, and 226 and a fourth dimension defined relative to the three dimensions 222, 224, and 226 (e.g., a fourth dimension that is diagonal relative to the other dimensions, as described above).

As described above with reference to FIG. 2A, in some implementations, the image processing system can obtain different models of the virtual objects 220 or 230 according to the respective location of the virtual objects within the environment 250. In some other implementations, the image processing system can obtain a single respective model of the virtual objects 220 or 230 and process the single model according to the respective location of the virtual objects within the environment 250.

In a second example, the depictions of the virtual objects 220 and 230 in the composite images can depend on the location of the device 210. For example, the depiction of the virtual objects 220 and 230 can depend on the position of the device 210 along one or more of: the first dimension 222, the second dimension 224, or the third dimension 226 of the environment 250.

For example, as the device 210 moves along the first dimension 222, the depiction of the virtual object 220 can change (e.g., the virtual object 220 can be depicted at a different time of day); as the device 210 moves along the second dimension 224, the depiction of the virtual object 220 can change in a different way than the first dimension 222 (e.g., the virtual object 220 can be depicted at a different time of year); and as the device 210 moves along the third dimension 226, the depiction of the virtual object 220 can change in a different way than the first dimension 222 and the second dimension 224 (e.g., the virtual object 220 can be depicted in a different year or century).

In a third example, the image processing system can process the composite images to change the depiction of the entire environment 250 according to the location of the device 210. For example, in addition to changing the depictions of the virtual objects to reflect a different time of day according to the location of the device 210, the image processing system can process the entire composite image so that the entire environment 250 appears as it would during the time of day corresponding to the location of the device 210.

In a fourth example, the image processing system can process the composite images to change the depiction of the entire environment 250 according to the common coordinate system of the environment 250. For example, in addition to changing the depictions of the virtual objects to reflect a different time of day according to the respective locations of the virtual objects within the environment 250, the image processing system can process the entire composite image so that each component of the environment 250 (e.g., corresponding to respective pixels of the composite image) appears as it would during the time of day corresponding to the location of the component in the environment 250. An example composite image generated in this way is described below with reference to FIG. 3.

Figure 3:
FIG. 3 illustrates an example composite image.

FIG. 3 illustrates an example composite image 300. The composite image depicts a scene that includes multiple objects (in this example, multiple animals). The depiction of each point in the scene, including each object in the scene, depends on the location of the point in a coordinate system of the scene. In particular, each point in the scene is rendered according to a different time of day, corresponding to the location of the point in the coordinate system.

The composite image 300 can be generated by an image processing system by processing an initial image of the scene depicted in the composite image 300. In particular, for each location within the scene and for each of one or more virtual objects at a respective location within the scene, the image processing system can render the location and virtual object at the location to appear as it would at a time of day corresponding to the location.

In the example depicted in FIG. 3, the depictions of the objects in the scene depend on a single dimensions, which is approximately in the diagonal direction from the top-left of the composite image 300 to the bottom-right of the composite image 300. The dimension along which the depictions of the objects change can be defined according to a light source within the environment of the composite image 300. In particular, points in the composite image 300 that are further towards the bottom-right (e.g., towards the eastern horizon) are depicted to be earlier in the day than points further towards the top-left (e.g., towards the western horizon).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

maintaining first data associating each location within an environment with a particular time;

obtaining an image depicting the environment from a point of view of a display device;

obtaining second data characterizing one or more virtual objects; and processing the obtained image and the second data to generate a composite image depicting the one or more virtual objects at respective locations in the environment from the point of view of the display device, wherein the composite image depicts each virtual object according to the particular time that the first data associates with the location of the virtual object in the environment.

Embodiment 2 is the method of embodiment 1, wherein:

the first data associates each location in the environment with a particular time of day, and the composite image depicts, for each virtual object, how the virtual object would appear at the time of day associated with the location of the virtual object in the environment.

Embodiment 3 is the method of embodiment 1, wherein:

the first data associates each location in the environment with a particular date in history, and the composite image depicts, for each virtual object, how the virtual object would appear on the date in history associated with the location of the virtual object in the environment.

Embodiment 4 is the method of embodiment 1, wherein:

the first data associates each location in the environment with a particular time of year, and the composite image depicts, for each virtual object, how the virtual object would appear at the time of year associated with the location of the virtual object in the environment.

Embodiment 5 is the method of any one of embodiments 1-4, wherein obtaining second data characterizing one or more virtual objects comprises:

obtaining third data characterizing the one or more virtual objects at a same time; and processing, for each virtual object, the third data according to the particular time associated with the location of the virtual object in the environment to generate the second data.

Embodiment 6 is a method comprising:

maintaining first data associating each location within an environment with a particular time;

determining a current location of a display device in the environment;

determining the time associated with the determined location in the maintained first data;

obtaining an image depicting the environment from a point of view of the display device; and processing the obtained image to generate a composite image for display on the display device according to the determined time.

Embodiment 7 is the method of embodiment 6, wherein:

the first data associates each location in the environment with a particular time of day, and the composite image depicts how the environment would appear at the time of day associated with the determined location.

Embodiment 8 is the method of embodiment 6, wherein:

the first data associates each location in the environment with a particular date in history, and the composite image depicts how the environment would appear on the date in history associated with the determined location.

Embodiment 9 is the method of embodiment 6, wherein:

the first data associates each location in the environment with a particular time of year, and the composite image depicts how the environment would appear at the time of year associated with the determined location.

Embodiment 10 is the method of any one of embodiments 6-9, wherein generating the composite image comprises obtaining second data characterizing one or more virtual objects at the determined time.

Embodiment 11 is the method of any one of embodiments 6-9, wherein generating the composite image comprises:

obtaining second data characterizing one or more virtual objects, and processing the second data according to the determined time to generate third data characterizing the one or more virtual objects at the determined time.

Embodiment 12 is a method comprising:

obtaining an image depicting an environment from a point of view of a display device;

obtaining data characterizing a virtual object;

determining a location of the display device in a common coordinate system of the environment;

determining a location corresponding to the virtual object in the common coordinate system of the environment;

determining whether a distance in the common coordinate system of the environment between the display device and the virtual object is below a predetermined threshold;

in response to determining that the distance between the display device and the virtual object is below the predetermined threshold, processing the obtained image to generate a composite image for display on the display device, wherein the composite image depicts the virtual object executing a first animation; and in response to determining that the distance between the display device and the virtual object is not below the predetermined threshold, processing the obtained image to generate a composite image for display on the display device, wherein the composite image depicts the virtual object executing a second animation that is different from the first animation.

Embodiment 13 is the method of embodiment 12, further comprising:

in response to determining that the distance between the display device and the virtual object is below the predetermined threshold, generating a composite sound that comprises a first sound associated with the virtual object.

Embodiment 14 is the method of any one of embodiments 12 or 13, wherein:

the virtual object is a model of an animal;

the first animation characterizes a reaction of the animal to a user of the display device; and the second animation characterizes the animal unaware of the user of the display device.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is one or more non-transitory computer storage media encoded with a computer program, the program comprising instructions that are operable, when executed by a data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

obtaining an image depicting a physical environment from a point of view of a display device;

obtaining data characterizing one or more virtual objects;

generating, using the image and the data, a composite image depicting the one or more virtual objects at respective locations in the composite image for display from the point of view of the display device;

determining a common coordinate system in the physical environment for the composite image, the common coordinate system having a first dimension and a second dimension;

determining whether a change in a position associated with the point of view of the display device along the first dimension or the second dimension satisfies a first threshold;

in response to determining that the change in position associated with the point of view of the display device along the first dimension satisfies the first threshold, modifying the one or more virtual objects with a first modification; and in response to determining that the change in position associated with the point of view of the display device along the second dimension satisfies a second threshold, modifying the composite image with a second modification, wherein the first modification and the second modification are different.

2. The method of claim 1, wherein modifying the composite image with the first modification or modifying the composite image with the second modification comprises changing a time of day in which one or more virtual objects are represented in the composite image.

3. The method of claim 1, wherein the first modification or the second modification are a time of day or weather condition.

4. The method of claim 1, wherein the first modification or the second modification is an animation or a sound that is directional and originating from a particular direction.

5. The method of claim 1, wherein the first modification or the second modification is a selection of one or more modifications.

6. The method of claim 1, comprising:

modifying a first or second virtual object in response to the respective virtual object changing position relative to the first dimension or the second dimension.

7. The method of claim 1, wherein the first modification causes a first virtual object to react to the position associated with the point of view of the display device.

8. The method of claim 1, wherein the composite image comprises a representation of the physical environment at a time other than a current time.

9. The method of claim 1, wherein the composite image is scalable to the physical environment using the common coordinate system.

10. The method of claim 1 comprising:

determining a distance between the position associated with the point of view of the display device and a first physical object; and modifying the composite image with an additional virtual object responsive to the distance between the position associated with the point of view of the display device and the first physical object.

11. The method of claim 1, comprising:

modifying the composite image to depict objects in the composite image according to a light source along the first dimension or the second dimension in the composite image.

12. The method of claim 1, wherein generating, using the image and the data, the composite image depicting the one or more virtual objects at respective locations in the composite image for display from the point of view of the display device comprises:

generating for use in the composite image a spatial boundary indicating a trigger point for a change in depiction of the composite image.

13. The method of claim 1, wherein generating, using the image and the data, the composite image depicting the one or more virtual objects at respective locations in the composite image for display from the point of view of the display device comprises:

generating for use in the composite image a visual indication indicating a trigger point for a change in depiction of the composite image.

14. The method of claim 1, wherein the first modification or the second modification are a time of year.

15. One or more non-transitory computer storage media encoded with instructions that, when executed by one or more computers, cause the one or more computers to perform operations comprising:

obtaining an image depicting a physical environment from a point of view of a display device;

obtaining data characterizing one or more virtual objects;

generating, using the image and the data, a composite image depicting the one or more virtual objects at respective locations in the composite image for display from the point of view of the display device;

determining a common coordinate system in the physical environment for the composite image, the common coordinate system having a first dimension and a second dimension;

determining whether a change in a position associated with the point of view of the display device along the first dimension or the second dimension satisfies a first threshold;

in response to determining that the change in position associated with the point of view of the display device along the first dimension satisfies the first threshold, modifying the one or more virtual objects with a first modification; and in response to determining that the change in position associated with the point of view of the display device along the second dimension satisfies a second threshold, modifying the composite image with a second modification, wherein the first modification and the second modification are different.

16. A system comprising one or more computers and one or more storage devices on which are stored instructions that are operable, when executed by the one or more computers, to cause the one or more computers to perform operations comprising:

obtaining an image depicting a physical environment from a point of view of a display device;

obtaining data characterizing one or more virtual objects;

generating, using the image and the data, a composite image depicting the one or more virtual objects at respective locations in the composite image for display from the point of view of the display device;

determining a common coordinate system in the physical environment for the composite image, the common coordinate system having a first dimension and a second dimension;

determining whether a change in a position of the point of view of the display device along the first dimension or the second dimension satisfies a first threshold;

in response to determining that the change in position associated with the point of view of the display device along the first dimension satisfies the first threshold, modifying the one or more virtual objects with a first modification; and in response to determining that the change in position associated with the point of view of the display device along the second dimension satisfies a second threshold, modifying the composite image with a second modification, wherein the first modification and the second modification are different.

17. The system of claim 16, wherein:

the first dimension along which depictions of the one or more virtual objects change is defined by a light source within the composite image.

18. The system of claim 16, wherein the first modification causes a first virtual object to react to the position associated with the point of view of the display device.

19. The system of claim 16, wherein the composite image comprises a representation of the physical environment at a time other than a current time.

20. The system of claim 16, wherein the composite image is scalable to the physical environment using the common coordinate system.

* * * * *